United States Patent
Palanki et al.

(10) Patent No.: US 9,900,779 B2
(45) Date of Patent: Feb. 20, 2018

(54) CENTRALIZED CONTROL OF PEER-TO-PEER COMMUNICATION

(75) Inventors: Ravi Palanki, San Diego, CA (US); Avneesh Agrawal, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 369 days.

(21) Appl. No.: 12/643,842

(22) Filed: Dec. 21, 2009

(65) Prior Publication Data

US 2010/0169498 A1   Jul. 1, 2010

Related U.S. Application Data

(60) Provisional application No. 61/141,627, filed on Dec. 30, 2008.

(51) Int. Cl.
  *G06F 15/16* (2006.01)
  *H04W 16/14* (2009.01)
  (Continued)

(52) U.S. Cl.
  CPC .......... *H04W 16/14* (2013.01); *H04W 28/16* (2013.01); *H04W 76/02* (2013.01);
  (Continued)

(58) Field of Classification Search
  CPC ... H04W 16/14; H04W 28/16; H04W 76/023; H04W 76/02; H04W 84/045; H04W 92/18; H04W 48/08
  (Continued)

(56) References Cited

U.S. PATENT DOCUMENTS 5,475,870 A    12/1995  Weaver, Jr. et al.
7,283,832 B2 * 10/2007  Jia et al. ................ 455/517
(Continued)

FOREIGN PATENT DOCUMENTS

CN       1527623 A    9/2004
CN     101310551 A   11/2008
(Continued)

OTHER PUBLICATIONS

Wei, H. and Gitlin, R. "WWAN/WLAN Two-Hop-Relay Architecture for Capactiy Enhancement" WCNC 2004 / IEEE Communications Society. 2004. pp. 225-230.*

(Continued)

*Primary Examiner* — John Macilwinen
(74) *Attorney, Agent, or Firm* — Arent Fox LLP

(57) ABSTRACT

Techniques for centralized control of peer-to-peer (P2P) communication and centralized control of femto cell operation are described. For centralized control of P2P communication, a designated network entity (e.g., a base station) may control P2P communication of stations (e.g., UEs) located within its coverage area. The designated network entity may receive an indication of a first station (e.g., a UE) desiring to communicate with a second station (e.g., another UE). The designated network entity may determine whether or not to select peer-to-peer communication for the first and second stations, e.g., based on the quality of their communication link. The designated network entity may assign resources to the stations if peer-to-peer communication is selected. For centralized control of femto cell operation, the designated network entity may control the operation of femto cells (e.g., may activate or deactivate femto cells) within its coverage area.

11 Claims, 6 Drawing Sheets

(51) Int. Cl.
*H04W 76/02* (2009.01)
*H04W 28/16* (2009.01)
*H04W 48/08* (2009.01)
*H04W 84/04* (2009.01)
*H04W 92/18* (2009.01)

(52) U.S. Cl.
CPC .......... *H04W 76/023* (2013.01); *H04W 48/08* (2013.01); *H04W 84/045* (2013.01); *H04W 92/18* (2013.01)

(58) Field of Classification Search
USPC .......................................................... 709/228
See application file for complete search history.

(56) References Cited

U.S. PATENT DOCUMENTS

| | | | |
|---|---|---|---|
| 7,627,680 B2 * | 12/2009 | Hutcheson et al. | 709/228 |
| 8,499,079 B2 * | 7/2013 | Giles et al. | 709/226 |
| 2005/0239451 A1 * | 10/2005 | Periyalwar | H04W 52/383 455/425 |
| 2005/0254620 A1 | 11/2005 | Shoji et al. | |
| 2006/0165035 A1 | 7/2006 | Chandra et al. | |
| 2006/0168343 A1 * | 7/2006 | Ma | H04W 52/38 709/245 |
| 2007/0097938 A1 | 5/2007 | Nylander et al. | |
| 2007/0254320 A1 | 11/2007 | Olstein | |
| 2007/0254620 A1 | 11/2007 | Lindqvist et al. | |
| 2008/0002658 A1 | 1/2008 | Soliman | |
| 2009/0111499 A1 | 4/2009 | Bosch et al. | |
| 2010/0189048 A1 * | 7/2010 | Baker | H04L 5/0037 370/329 |

FOREIGN PATENT DOCUMENTS

| | | | | |
|---|---|---|---|---|
| EP | 1 744 502 A1 * | 1/2007 | | H04L 12/56 |
| EP | 1998499 | 12/2008 | | |
| JP | H0723464 A | 1/1995 | | |
| JP | 2008527884 A | 7/2008 | | |
| JP | 2008193306 A | 8/2008 | | |
| WO | 9608936 A1 | 3/1996 | | |
| WO | 2006075274 A1 | 7/2006 | | |
| WO | WO2007040449 A1 | 4/2007 | | |
| WO | WO08034029 | 3/2008 | | |
| WO | WO08034044 | 3/2008 | | |
| WO | WO-2008131588 A1 | 11/2008 | | |

OTHER PUBLICATIONS

International Search Report and Written Opinion—PCT/US2009/069615, International Search Authority—European Patent Office—dated Oct. 19, 2010.

Mariana Goldhamer: "Control channel allocation for femto-cells (IEEE C802.16m-08/1350r1)" Internet Citation Oct. 31, 2008 (Oct. 31, 2008), pp. 1-8, XP002566665 Retrieved from the Internet: URL: http://www. IEEE802. org/l6/tgm/contrib/ [ retrieved on Mar. 2, 2010] the whole document .

Mariana Goldhamer: "Operational rules for self-organized radio deployment (IEEE C802.16m-08/1352)" Internet Citation Oct. 31, 2008 (Oct. 31, 2008), pp. 1-5, XP002566666 Retrieved from the Internet : URL: http ://www. IEEE802 .org/l6/tgm/contrib/ C80216m-08-1352.pdf [ retrieved on Feb. 31, 2010 the whole document.

Partial International Search Report—PCT/US2009/069615—International Search Authority, European Patent Office, dated Jun. 30, 2010.

European Search Report—EP12160801—Search Authority—Berlin—dated Apr. 19, 2012.

European Search Report—EP12160804—Search Authority—Berlin dated Apr. 20, 2012.

Taiwan Search Report—TW102108270—TIPO—dated Sep. 18, 2014.

* cited by examiner

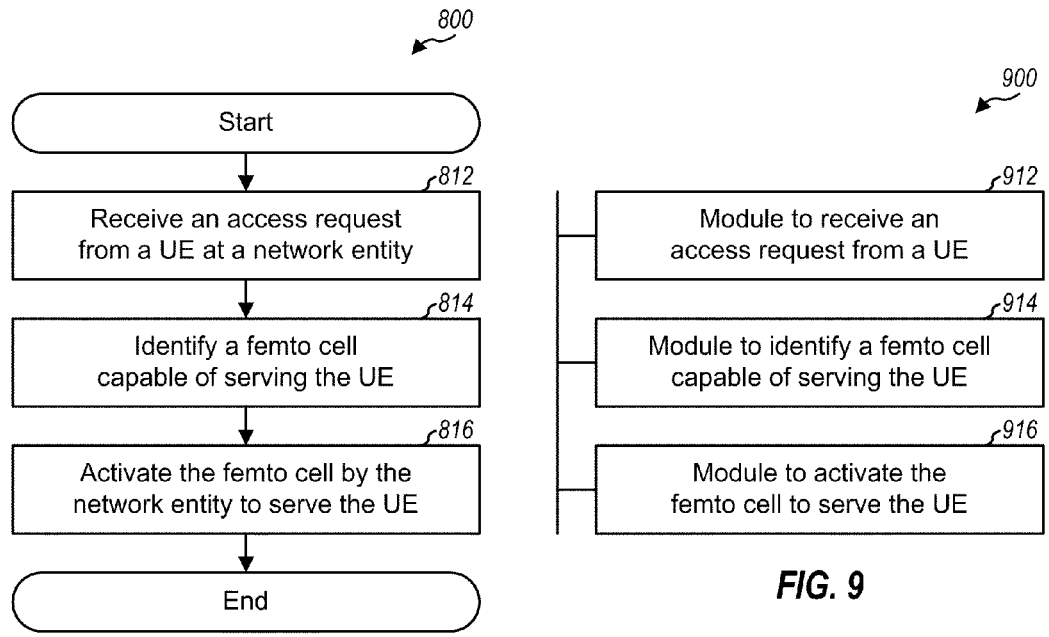
*FIG. 8*
*FIG. 9*
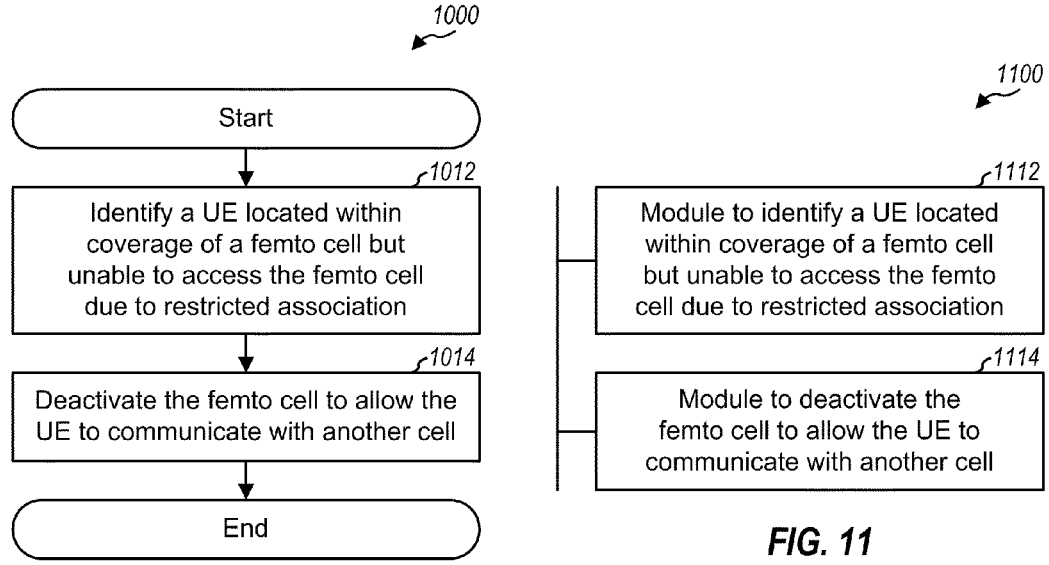
*FIG. 10*
*FIG. 11*

CENTRALIZED CONTROL OF PEER-TO-PEER COMMUNICATION

The present application claims priority to provisional U.S. Application Ser. No. 61/141,627, entitled "CENTRALIZED PEER-TO-PEER COMUNICATION," filed Dec. 30, 2008, assigned to the assignee hereof and incorporated herein by reference.

BACKGROUND

I. Field

The present disclosure relates generally to communication, and more specifically to techniques for controlling communication in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station. The UE may also be able to communicate directly with another UE via peer-to-peer communication. It may be desirable to control communication of the UE such that good performance can be achieved for both the UE and the network.

SUMMARY

Techniques for centralized control of peer-to-peer (P2P) communication and centralized control of femto cell operation are described herein. In an aspect, for centralized control of P2P communication, a designated network entity (e.g., a base station) may control P2P communication of stations located within a coverage area. In one design, the designated network entity may receive an indication of a first station (e.g., a UE) desiring to communicate with a second station (e.g., another UE or a cell). The designated network entity may also receive information indicative of the quality of the communication link between the first and second stations. The designated network entity may determine whether or not to select peer-to-peer communication for the first and second stations, e.g., based on the received information. The designated network entity may assign resources to the first and second stations if peer-to-peer communication is selected and may send information indicative of whether peer-to-peer communication is selected, the assigned resources if any, and/or other information to the first and second stations.

In another aspect, for centralized control of femto cell operation, a designated network entity (e.g., a base station) may control the operation of femto cells within a coverage area. In one design, the designated network entity may receive an access request from a UE, may identify a femto cell capable of serving the UE, and may activate the femto cell to serve the UE. In another design, the designated network entity may identify a UE located within the coverage of a femto cell but unable to access the femto cell due to restricted association. The designated network entity may deactivate the femto cell to allow the UE to communicate with another cell.

Various aspects and features of the disclosure are described in further detail below.

BRIEF DESCRIPTION OF THE DRAWINGS

FIGS. 8 and 9 show a process and an apparatus, respectively, for centralized control of femto cell operation.

FIGS. 10 and 11 show another process and another apparatus, respectively, for centralized control of femto cell operation.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies.

Figure 1:
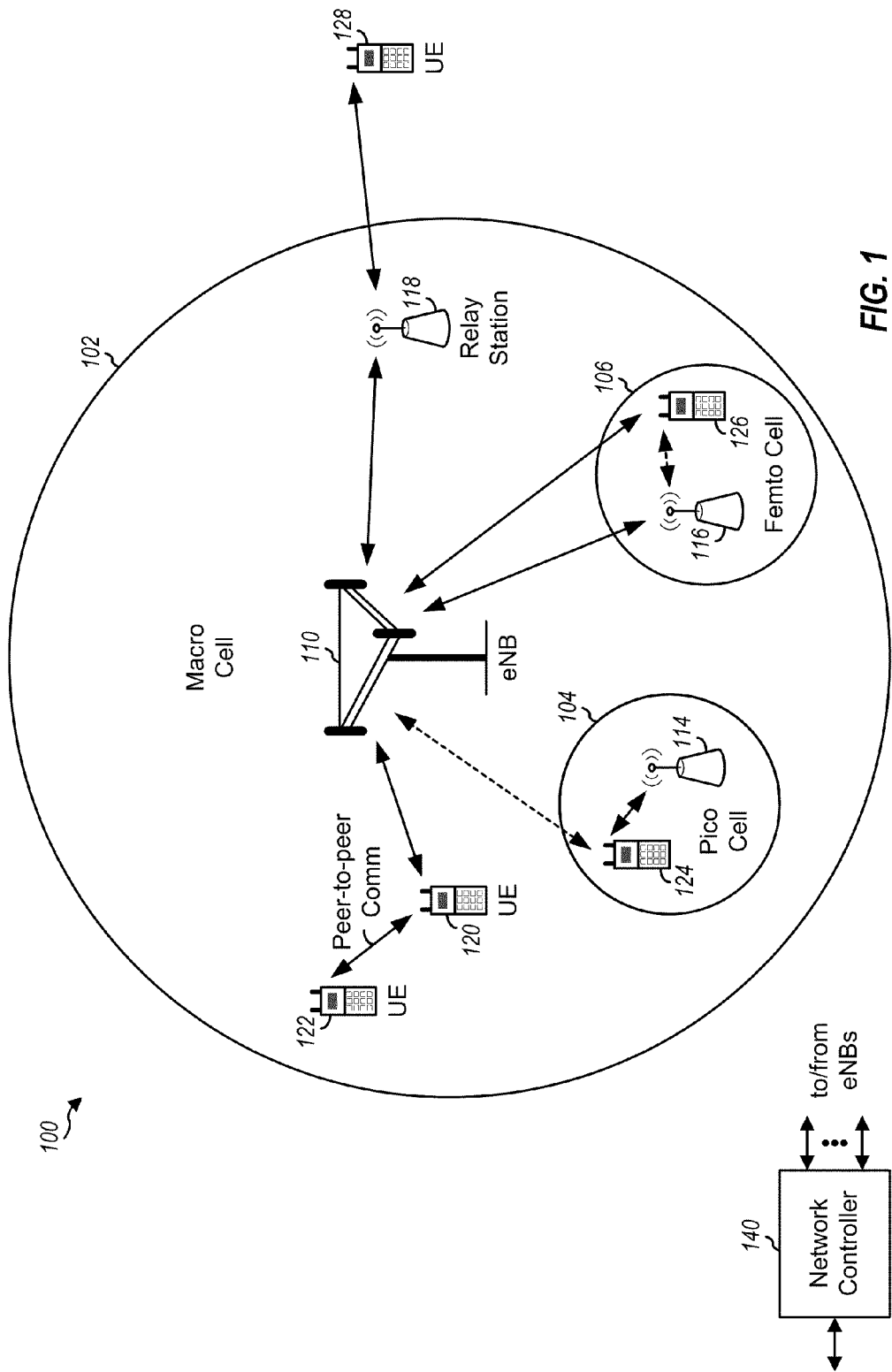
FIG. 1 shows a wireless communication network.

FIG. 1 shows a wireless communication network 100, which may be a wireless wide area network (WWAN). Network 100 may be a cellular network such as an LTE network or some other WWAN. Network 100 may include a number of evolved Node Bs (eNBs) and other network entities that can support communication for a number of UEs. An eNB may be a station that communicates with the UEs and may also be referred to as a base station, a Node B, an access point, etc. An eNB may provide communication coverage for a particular geographic area. In 3GPP, the term "cell" can refer to a coverage area of an eNB and/or an eNB subsystem serving this coverage area, depending on the context in which the term is used. An eNB may support one or multiple (e.g., three) cells.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). A femto cell may also be a Local IP Access (LIPA)-only femto cell, which may not allow UEs to connect to the Internet but may have local traffic originating in the femto cell itself. For example, a store may have a LIPA-only femto cell that sends coupons to cellular phones in its vicinity. An eNB for a macro cell may be referred to as a macro eNB. An eNB for a pico cell may be referred to as a pico eNB. An eNB for a femto cell may be referred to as a femto eNB or a home eNB. In FIG. 1, an eNB 110 may be a macro eNB for a macro cell 102, an eNB 114 may be a pico eNB for a pico cell 104, and an eNB 116 may be a femto eNB for a femto cell 106. The terms "base station", "eNB", and "cell" may be used interchangeably.

A relay station 118 may be a station that receives a transmission of data and/or other information from an upstream station (e.g., eNB 110 or a UE 128) and sends a transmission of the data and/or other information to a downstream station (e.g., UE 128 or eNB 110). A relay station may also be a UE that relays transmissions for other UEs. A relay station may also be referred to as a relay, a relay eNB, a relay UE, etc. In FIG. 1, relay station 118 may communicate with UE 128 via an access link and may communicate with eNB 110 via a backhaul link to support communication between UE 128 and eNB 110.

UEs 120 to 128 may be dispersed throughout the wireless network, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc. A UE may communicate with eNBs and/or relay stations in a WWAN. A UE may also communicate with access points in a wireless local area network (WLAN), which may utilize IEEE 802.11 (Wi-Fi) or some other radio technology. A UE may also communicate with other devices in a wireless personal area network (WPAN), which may utilize Bluetooth or some other radio technology.

A network controller 140 may couple to a set of eNBs and may provide coordination and control for these eNBs. Network controller 140 may comprise a Radio Network Controller (RNC), a Mobile Switching Center (MSC), a Mobility Management Entity (MME), a Serving Gateway (SGW), a Packet Data Network (PDN) Gateway (PGW), and/or some other network entity.

In general, a macro eNB may communicate with any number of stations. A macro eNB may also control communication for stations within its coverage. A station may be a UE, a relay station, a femto eNB, a pico eNB, a peripheral device such as a printer, etc. For simplicity, in much of the description below, a macro eNB may be referred to as simply an eNB.

Network 100 may support peer-to-peer (P2P) communication between stations. For P2P communication, two stations (e.g., UEs 120 and 122) may communicate directly with each other without communicating with an eNB in a WWAN. P2P communication may reduce the load on the WWAN for local communications between the stations. P2P communication between UEs may also allow one of the UEs to act as a relay for the other UE, thereby enabling the other UE to connect to an eNB.

In an aspect, centralized control of P2P communication may be supported to improve performance. For centralized control of P2P communication, a designated network entity may control P2P communication for stations located within its coverage area. This coverage area may be a cell, a cluster of cells, etc. The designated network entity may control various aspects of P2P communication such as selection of stations for P2P communication, resource allocation, interference management, etc. In one design, the designated network entity may be an eNB that can control P2P communication for stations within its coverage. In other designs, the designated network entity may be a network entity such as an MME that can control P2P communication for stations in a cluster of cells.

Figure 2:
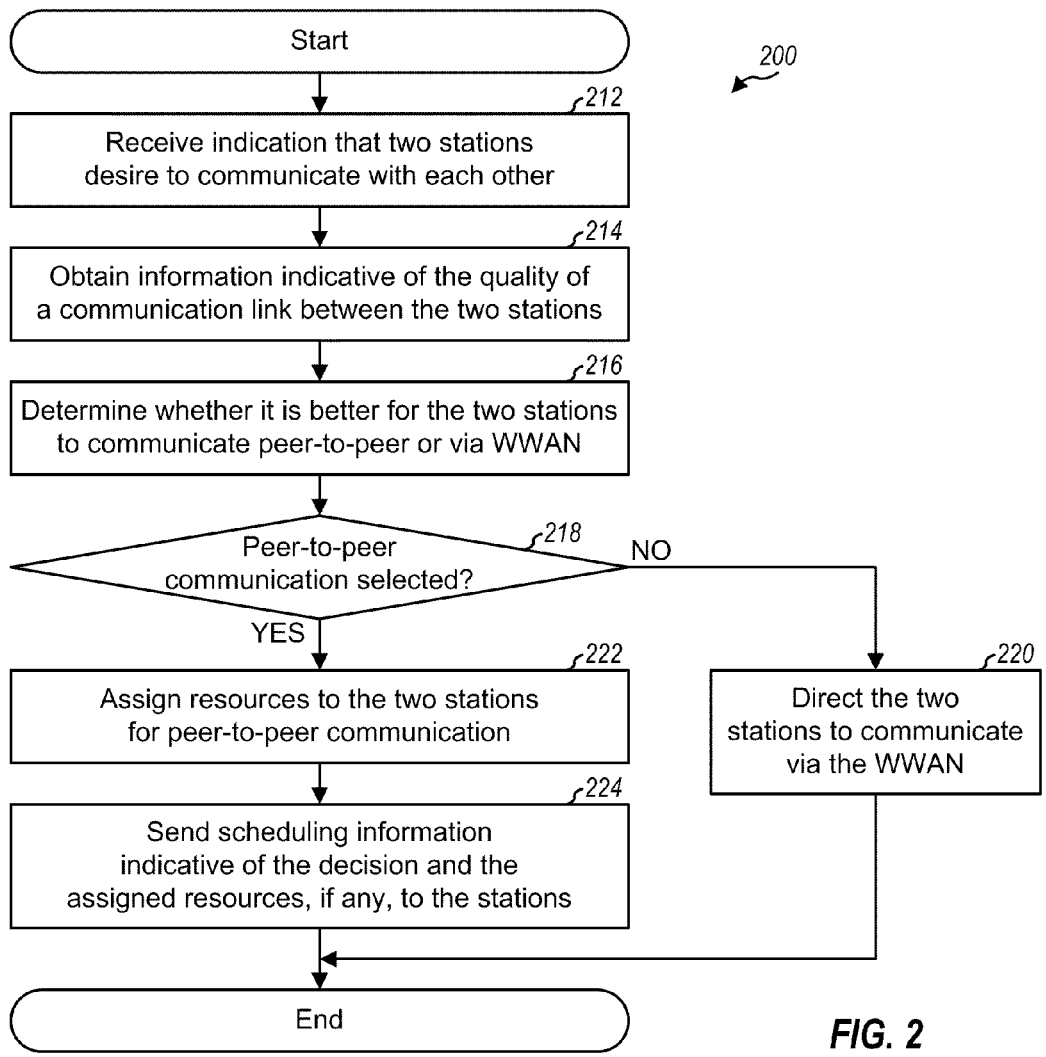
FIG. 2 shows a process for centralized control of P2P communication.

FIG. 2 shows a design of a process 200 for centralized control of P2P communication. For clarity, process 200 assumes that the designed network entity is an eNB, e.g., eNB 110 in FIG. 1. The eNB may receive an indication that two stations (e.g., UEs 120 and 122 in FIG. 1) desire to communicate with each other (block 212). The eNB may obtain information indicative of the quality of the communication link between the two stations (block 214). For example, a user of a first UE may call another user of a second UE, and the call may be initially placed via the eNB. The first UE may send the UE identity (ID) of the second UE and information indicative of the quality of the communication link between the first and second UEs to the eNB.

The eNB may determine whether it is better to allow the two stations to communicate directly with each other or via the WWAN (block 216). The eNB may make this determination based on the information indicative of the link quality and/or other information. For example, if the two stations are far from each other or are located in different cells/geographic areas, then the eNB may determine that it would be better for the stations to communicate via the WWAN (e.g., using WWAN resources). Conversely, if the two stations are sufficiently close to each other, then it may be more beneficial for these stations to communicate directly with each other in order to reduce usage of WWAN resources for the communication.

If P2P communication is not selected for the two stations, as determined in block 218, then the eNB may direct the two stations to communicate via the WWAN (block 220). Conversely, if P2P communication is selected for the two stations, as determined in block 218, then the eNB may assign resources to the two stations for P2P communication (block 222). The assigned resources may comprise time-frequency resources (or bandwidth), etc. The eNB may also assign transmit power levels to the two stations for P2P communication. In one design, both downlink and uplink resources may be reserved for P2P communication and may not be used for WWAN communication (i.e., communication with the WWAN). This may be similar to a macro eNB reserving some resources for pico cells to enable cell splitting gains. In this design, one station may act as an eNB and may transmit using downlink resources, and the other station may act as a UE and may transmit using uplink resources. This design may allow the two stations to communicate using the same radio technology (e.g., LTE) used for WWAN communication. In another design, resources for only one direction (e.g., the uplink) may be assigned for P2P communication. In this design, the two stations may communicate peer-to-peer on the uplink using time division duplexing (TDD).

The eNB may send scheduling information indicative of its decision and the assigned resources, if any, to the stations (block 224). The eNB may send the scheduling information to each station directly or to the originating station, which may forward the information to the other station.

The stations may receive the scheduling information from the eNB and may communicate peer-to-peer, if selected, using the assigned resources. The stations may slowly increase their transmit power levels to the assigned power levels in order to avoid causing sudden increase in interference, which may adversely impact the operation of nearby stations. The stations may communicate peer-to-peer using either the same radio technology used for WWAN communication (e.g., LTE-A) or a different radio technology (e.g., FlashLinQ, which is designed especially for P2P communication).

The two stations may be of the same type, e.g., two UEs. The two stations may also be of different types. For example, one station may be a UE whereas the other station may be a femto cell. In this case, the eNB may instruct the femto cell (or home eNB) to start transmitting when the UE becomes active, or based on the geographic or radio location of the UE, or based on prior geographic/radio history of the UE.

In general, P2P communication may be beneficial when it would result in less interference to the network as compared to WWAN communication. A decision on whether or not to use P2P communication for two stations may be made based on an estimated amount of interference caused by the two stations for P2P communication versus an estimated amount of interference caused by the two stations for WWAN communication. For communication with one station acting as a relay, the total interference due to both the access link and the backhaul link may be taken into consideration. The amount of interference caused by P2P communication may be roughly estimated based on the quality of the communication link between the two stations.

Figure 3:
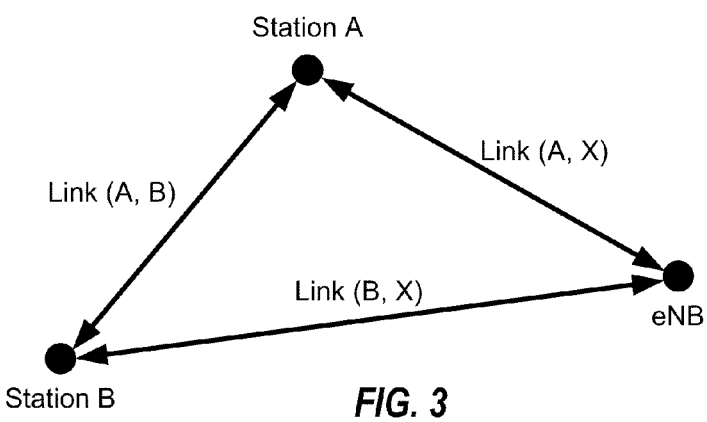
FIG. 3 shows communication links for a base station and two stations.

FIG. 3 shows communication links for two stations A and B and an eNB. The communication link between stations A and B may be referred to as link (A, B), the communication link between station A and the eNB may be referred to as link (A, X), and the communication link between station B and the eNB may be referred to as link (B, X). The amount of interference caused by P2P communication via link (A, B) may be dependent on the quality of this link, which may be estimated in various manners.

In one design, the quality of link (A, B) may be determined based on pilot measurements and/or interference measurements for this link. For example, station A may transmit a reference signal or pilot, and station B may measure the received signal strength of the reference signal from station A. Alternatively or additionally, station A may measure the received signal strength of a reference signal from station B.

In another design, the quality of link (A, B) may be determined based on the estimated distance between stations A and B. The distance between stations A and B may be estimated based on measurements of round trip delay (RTD) between these stations. The distance between stations A and B may also be determined based on the locations of these stations. The location of each station may be estimated based on a satellite-based positioning method or a network-based positioning method. In any case, the distance between stations A and B may be determined based on their estimated locations.

In yet another design, the quality of link (A, B) may be determined based on measurements made by both stations A and B for the same set of one or more transmitters. For example, each station may make pilot measurements for one or more cells. If the measurements made by station A somewhat match the measurements made by station B, then the two stations may be deemed to be in close proximity to one another and hence observe similar signals.

The quality of link (A, B) may also be determined in other manners. In general, the link quality may be determined based on one or more suitable criteria/parameters.

In one design, the quality of link (A, B) may be compared against a threshold. If the link quality exceeds the threshold, then P2P communication may be selected for the two stations. Otherwise, WWAN communication may be selected for the two stations. The link quality may be assigned a value to facilitate comparison against the threshold. The threshold may be selected based on a target amount of interference due to P2P communication and/or other considerations.

In another design, the quality of link (A, B) may be compared against the overall quality of link (A, X) and link (B, X). P2P communication may be selected if the P2P link is sufficiently better than the WWAN links, and WWAN communication may be selected otherwise.

FIG. 3 shows a simple example with two stations desiring to communicate with one another. In general, any number of pairs of stations may desire to communicate with one another. Each pair of stations may cause interference to other pairs of stations. A scheduling algorithm may determine which pairs of stations should communicate peer-to-peer and what resources to assign to these pairs of stations.

In one scheduling design, a connectivity graph of all stations desiring to communicate may be formed. The connectivity graph may include (i) a node for each station desiring to communicate with another station and (ii) an edge or line between each pair of nodes for stations with interference above a particular threshold. Each edge may also be associated with a value indicative of the amount of interference for that edge in order to allow for "soft" edges. The edges may be determined based on pilot reports received from the stations and/or other information described above. The graph may represent interference conditions for all stations desiring to communicate with other stations.

The graph may be colored to maximize capacity. Coloring refers to assignment of resources to stations for P2P communication. Different colors may be used to denote different resources (e.g., different sets of subcarriers) that may be assigned to the stations. For example, a set of colors D1, D2, D3, etc. may be defined for downlink resources for nodes acting as eNBs, and another set of colors U1, U2, U3, etc. may be defined for uplink resources for nodes acting as UEs. The downlink and uplink resources may be for (i) different frequency channels with frequency division duplexing (FDD) or (ii) the same frequency channel with time division duplexing (TDD). For TDD, the D and U resources (e.g., time slots) may both be for the uplink but may occur at different times. For a given P2P link between a pair of nodes, one node may be colored with Dn, and the other node may be colored with Um. Coloring may also be performed dynamically, e.g., for nodes that switch between downlink and uplink depending on bandwidth needs.

In one design, a greedy algorithm may be used for coloring to maximize capacity. For the greedy algorithm, a node with the highest degree and a corresponding peer node may be removed from the graph. The degree of a node/device is given by the number of edges connected to that node and corresponds to the number of peer devices with which the node/device has interference conditions. The highest degree node may interfere with a lot of P2P communication and may thus adversely impact cell-splitting gains. The stations corresponding to the removed nodes may communicate via the WWAN instead of peer-to-peer. After removing the pair of highest degree nodes from the graph, the smallest number of colors (or resources) that can be used for the graph may be determined. This graph coloring may be NP-complete, and various algorithms may be used to simplify the coloring or resource assignment. After coloring, the capacity or achievable data rates of the nodes in the graph may be determined based on the colors assigned to the nodes and using a suitable metric.

The process described above may be repeated iteratively. Another pair of nodes with the highest degree may be removed from the graph, colors may be assigned to the remaining nodes in the graph, and the capacity of the nodes may be determined based on the assigned colors. If the capacity for the current iteration is higher than the capacity for the previous iteration, then the process may be repeated once more. The process may be terminated when removing nodes does not improve capacity. The stations corresponding to the nodes in the graph with the highest capacity may be selected for P2P communication. The resources corresponding to the colors for these nodes may be assigned to the selected stations.

The connectivity graph may be defined for stations in a given coverage area, which may cover a single macro cell, a cluster of macro cells, etc. This may result in boundary conditions. Appropriate message passing algorithms for the connectivity graph may be used for resource partitioning.

In one design, centralized control may be used for P2P communication between UEs as well as P2P communication between UEs and non-UEs, e.g., between a UE and a femto cell. In another design, centralized control may be used for P2P communication between UEs, and distributed control may be used for P2P communication between UEs and non-UEs. For centralized control, a designated network entity (e.g., a master eNB) may make all resource allocation decisions. For distributed control, resource allocation decisions may be made by different entities such as femto cells, e.g., either autonomously or via cooperation using message exchanges. The number of UEs desiring P2P communication in a macro cell may be small, and these UEs may fall back to WWAN communication. Such fallback may not be available for femto cells, which may favor distributed control. In yet another design, semi-centralized control may be used. In this design, some scheduling (e.g., for intra-cell P2P communication) may be performed in a centralized manner (e.g., by an eNB), while other scheduling (e.g., for inter-cell P2P communication) may be performed in a distributed manner.

An eNB may control P2P communication for stations within its coverage. The eNB may also instruct some stations to act as relays for other stations and may assign resources to these stations. The eNB may determine which stations to select as relay stations based on various criteria such as capacity, interference, UE power and complexity, UE mobility, etc. For example, the eNB may select stations that would cause the least amount of interference on both the access link and the backhaul link. The eNB may also select multiple stations to act as relay stations for a single station.

In another aspect, centralized control of femto cell operation may be supported to improve performance. A designated network entity may control the operation of femto cells within a coverage area. In one design, the designated network entity may be an eNB controlling femto cells within its coverage area. In other designs, the designated network entity may be a network entity such as an MME that can control femto cells in a cluster of macro cells.

In one design, an eNB may activate a femto cell for communication with a UE when the UE attempts to access the eNB. This femto cell may be a cell that the UE can access. For example, in FIG. 1, eNB 110 may activate femto cell 116 for communication with UE 126. The eNB may identify the femto cell based on a UE ID of the UE and a mapping of UE IDs to femto cells. This mapping may be generated via registration by the femto cells and/or the UEs, via reports from the femto cells and/or the UEs, etc. The eNB may also identify the femto cell based on signaling from the UE, which may specifically identify the femto cell. The eNB may also identify the femto cell based on geographic locations of the UE and the femto cell, which may be estimated in various manners as described above. The eNB may also identify the femto cell based on radio location, e.g., based on the femto cell having similar pilot strength measurements as the UE. The eNB may also identify the femto cell based on past history of communication between the femto cell and the UE. Past history information may be gathered by having femto cells and/or UEs report their communication to the eNB. The eNB may also identify the femto cell that can serve the UE based on other information.

The eNB may assign resources to the femto cell for communication with the UE. The femto cell may raise its transmit power slowly in order to prevent connection drops for the UE as well as other UEs in the vicinity.

Femto cells may be activated, as needed, to support communication for UEs, as described above. The activated femto cells may be assigned resources (e.g., via efficient coloring) to support communication with the UEs. Significant reduction in interference may be achieved by having only the activated femto cells transmit. The activated femto cells may also utilize less resources (e.g., less bandwidth). These factors may improve overall capacity and performance Centralized control may also enable the eNB to efficiently manage interference conditions and resource usage.

Centralized control of femto cell operation may be able to mitigate coverage holes for UEs. A UE may be located within the coverage of a femto cell that the UE cannot access due to restricted association. If the femto cell transmits continually even when it is not serving any UEs, then the UE may observe excessive interference from the femto cell and may be unable to communicate with a macro cell or another femto cell. The UE would then be within a coverage hole due to the femto cell. The eNB may deactivate the femto cell in order to mitigate interference to the UE, which may then allow the UE to communicate with another cell.

In one design, the eNB may deactivate the femto cell if at least one restricted UE, which cannot access the femto cell, is located within the coverage of the femto cell. In another design, the eNB may allow the femto cell to be active when the restricted UE(s) are idle and may deactivate the femto cell when any of the idle UEs become active. The eNB may also control the femto cell in other manners. Some resources may be reserved to enable the eNB to communicate with (e.g., to send pages to) the restricted UE(s).

A femto cell may have one or more restricted UEs within its coverage, and the restricted UE(s) may be outside of macro coverage. This may be the case, e.g., when the femto cell is deployed indoor. Deactivating the femto cell in this scenario may not provide benefits to the restricted UE(s). In one design, the femto cell may turn on periodically and may gather reports sent by UEs. If the reports indicate the presence of one or more macro cells, then the femto cell can shut down. Otherwise, the femto cell can stay on.

Figures 4, 5:
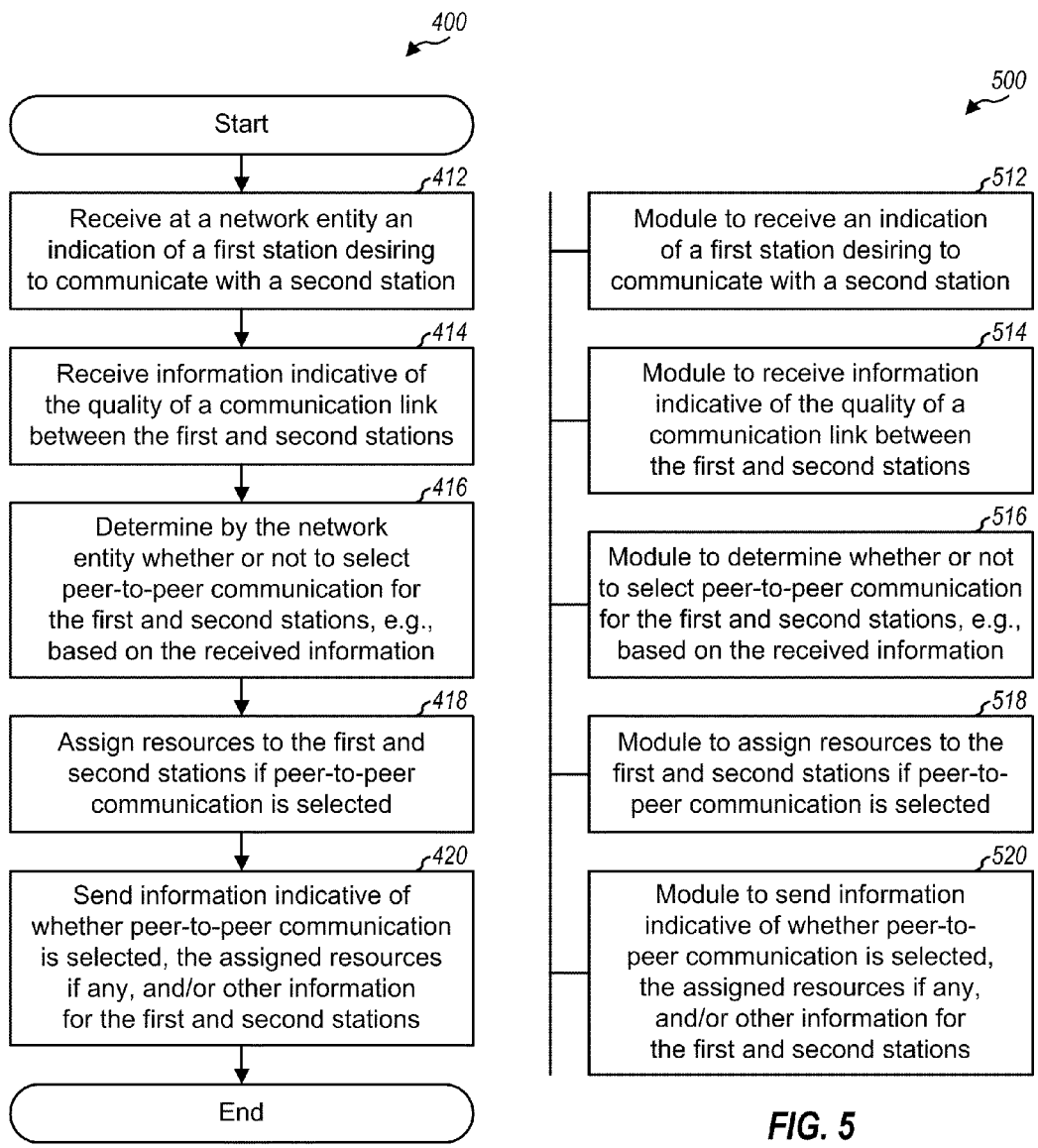
FIGS. 4 and 5 show a process and an apparatus, respectively, for supporting peer-to-peer communication by a designated network entity.

FIG. 4 shows a design of a process 400 for supporting peer-to-peer communication. Process 400 may be performed by a network entity, which may be a base station, a network controller, etc. The network entity may receive an indication of a first station desiring to communicate with a second station (block 412). The network entity may also receive information indicative of the quality of a communication link between the first and second stations (block 414). This information may comprise pilot measurements, interference measurements, RTD measurements, location information, etc., or a combination thereof.

The network entity may determine whether or not to select peer-to-peer communication for the first and second stations, e.g., based on the received information (block 416). In one design, the network entity may compare the quality of the communication link between the first and second stations against a threshold and may select peer-to-peer communication for these stations if the quality of the communication link exceeds the threshold. The network entity may also select peer-to-peer communication or WWAN communication for the first and second stations in other manners and/or based on other selection criteria.

The network entity may assign resources to the first and second stations if peer-to-peer communication is selected (block 418). The assigned resources may comprise time and/or frequency resources, transmit power levels, etc. The network entity may also designate (i) one station to operate as a base station and transmit on the downlink and receive on the uplink and (ii) the other station to operate as a UE and transmit on the uplink and receive on the downlink. The network entity may also determine whether to select the second station as a relay station for the first station. The network entity may send information indicative of (i) whether peer-to-peer communication is selected for the first and second stations, (ii) the assigned resources if peer-to-peer communication is selected, (iii) which station will as act a base station, and/or (iv) other information for the first and second stations (block 420). Peer-to-peer communication may occur on frequency spectrum not used for WWAN communication or on frequency spectrum used for WWAN communication. The first and second stations may transmit using TDD (e.g., on uplink frequency spectrum) or FDD (e.g., on both downlink and uplink frequency spectrum) for peer-to-peer communication.

In one design, the network entity may be a base station that can control peer-to-peer communication for UEs within the coverage of the base station. The first and second stations may be two UEs. Alternatively, one station may be a UE while the other station may be a femto cell.

FIG. 5 shows a design of an apparatus 500 for supporting peer-to-peer communication by a network entity. Apparatus 500 includes a module 512 to receive an indication of a first station desiring to communicate with a second station, a module 514 to receive information indicative of the quality of a communication link between the first and second stations, a module 516 to determine whether or not to select peer-to-peer communication for the first and second stations, e.g., based on the received information, a module 518 to assign resources to the first and second stations if peer-to-peer communication is selected, and a module 520 to send information indicative of whether peer-to-peer communication is selected, the assigned resources if any, and/or other information for the first and second stations.

Figure 6:
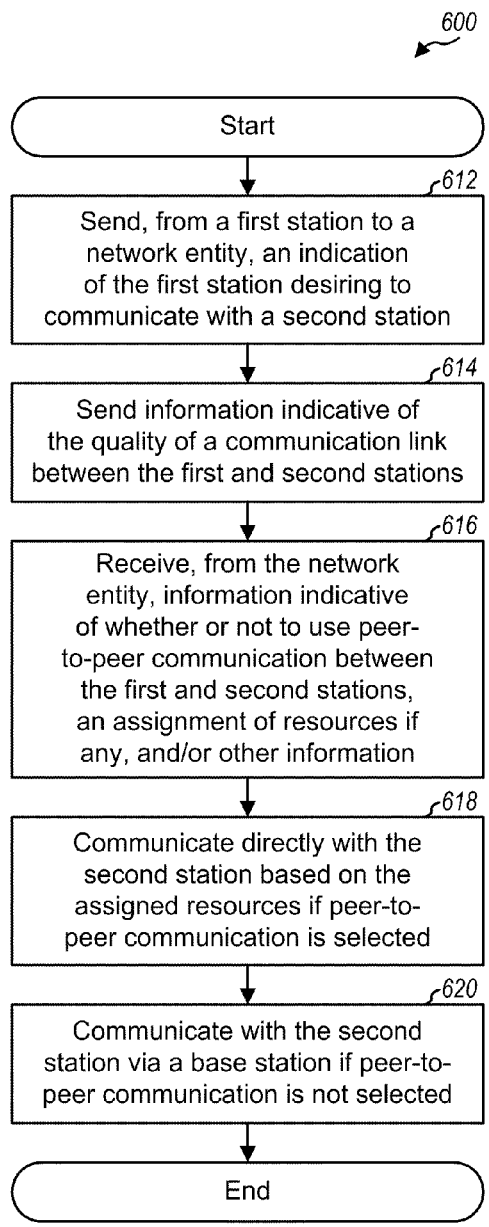
FIGS. 6 and 7 show a process and an apparatus, respectively, for communicating by a station.

FIG. 6 shows a design of a process 600 for wireless communication. Process 600 may be performed by a first station, which may be a UE or some other entity. The first station may send to a network entity an indication of a desire to communicate with a second station (block 612). The first station may also send information indicative of the quality of a communication link between the first and second stations (block 614). The first station may receive, from the network entity, information indicative of (i) whether or not to use peer-to-peer communication between the first and second stations, (ii) an assignment of resources if peer-to-peer communication is selected, and/or (iii) other information (block 616). The network entity may determine whether or not to use peer-to-peer communication based on the information sent by the first station. The first station may communicate directly with the second station based on the assigned resources if peer-to-peer communication is selected (block 618). The first station may communicate with the second station via a base station/WWAN if peer-to-peer communication is not selected (block 620).

Figure 7:
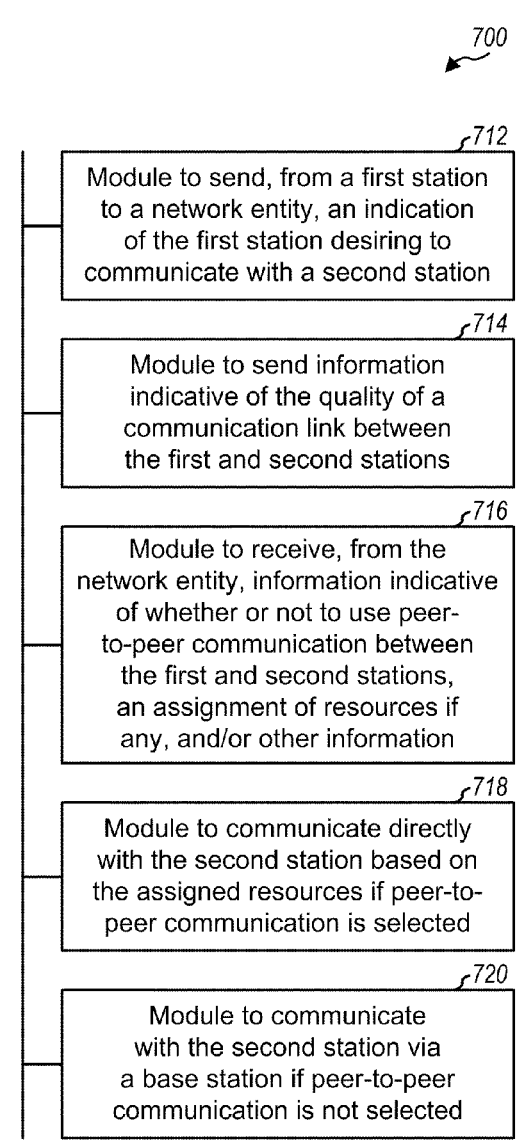

FIG. 7 shows a design of an apparatus 700 for wireless communication. Apparatus 700 includes a module 712 to send, from a first station to a network entity, an indication of the first station desiring to communicate with a second station, a module 714 to send information indicative of the quality of a communication link between the first and second stations, a module 716 to receive, from the network entity, information indicative of whether or not to use peer-to-peer communication between the first and second stations, an assignment of resources if any, and/or other information, a module 718 to communicate directly with the second station based on the assigned resources if peer-to-peer communication is selected, and a module 720 to communicate with the second station via a base station if peer-to-peer communication is not selected.

FIG. 8 shows a design of a process 800 for centralized control of femto cell operation. Process 800 may be performed by a network entity, which may be a base station, a network controller, etc. The network entity may receive an access request from a UE (block 812). The network entity may identify a femto cell capable of serving the UE (block 814). The femto cell may be identified based on a UE ID of the UE, information received from the UE, geographic locations of the UE and the femto cell, radio locations of the UE and the femto cell, past history of communication between the UE and the femto cell, some other information, or any combination thereof. The network entity may activate the femto cell to serve the UE (block 816).

FIG. 9 shows a design of an apparatus 900 for centralized control of femto cell operation. Apparatus 900 includes a module 912 to receive an access request from a UE, a module 914 to identify a femto cell capable of serving the UE, and a module 916 to activate the femto cell to serve the UE.

FIG. 10 shows a design of a process 1000 for centralized control of femto cell operation. Process 1000 may be performed by a network entity, which may be a base station, a network controller, etc. The network entity may identify a UE located within the coverage of a femto cell but unable to access the femto cell due to restricted association (block 1012). The network entity may deactivate the femto cell to allow the UE to communicate with another cell (block 1014). The network entity may allow the femto cell to operate if the UE is not within coverage of any macro cell. The network entity may also allow the femto cell to operate if the UE is in an idle mode and may deactivate the femto cell if the UE is not in the idle mode.

FIG. 11 shows a design of an apparatus 1100 for centralized control of femto cell operation. Apparatus 1100 includes a module 1112 to identify a UE located within the coverage of a femto cell but unable to access the femto cell due to restricted association, and a module 1114 to deactivate the femto cell to allow the UE to communicate with another cell.

The modules in FIGS. 5, 7, 9 and 11 may comprise processors, electronic devices, hardware devices, electronic components, logical circuits, memories, software codes, firmware codes, etc., or any combination thereof.

For clarity, much of the description above refers to P2P communication and WWAN communication. In general, the techniques described herein may be applicable for P2P communication and (i) WWAN communication between stations and base stations/eNBs, (ii) WLAN communication between stations and access points (e.g., using Wi-Fi), and (iii) WPAN communication between stations and devices (e.g., using Bluetooth). Hence, references to WWAN communication in the description above may be replaced with WWAN communication, WLAN communication, and/or WPAN communication.

Figure 12:
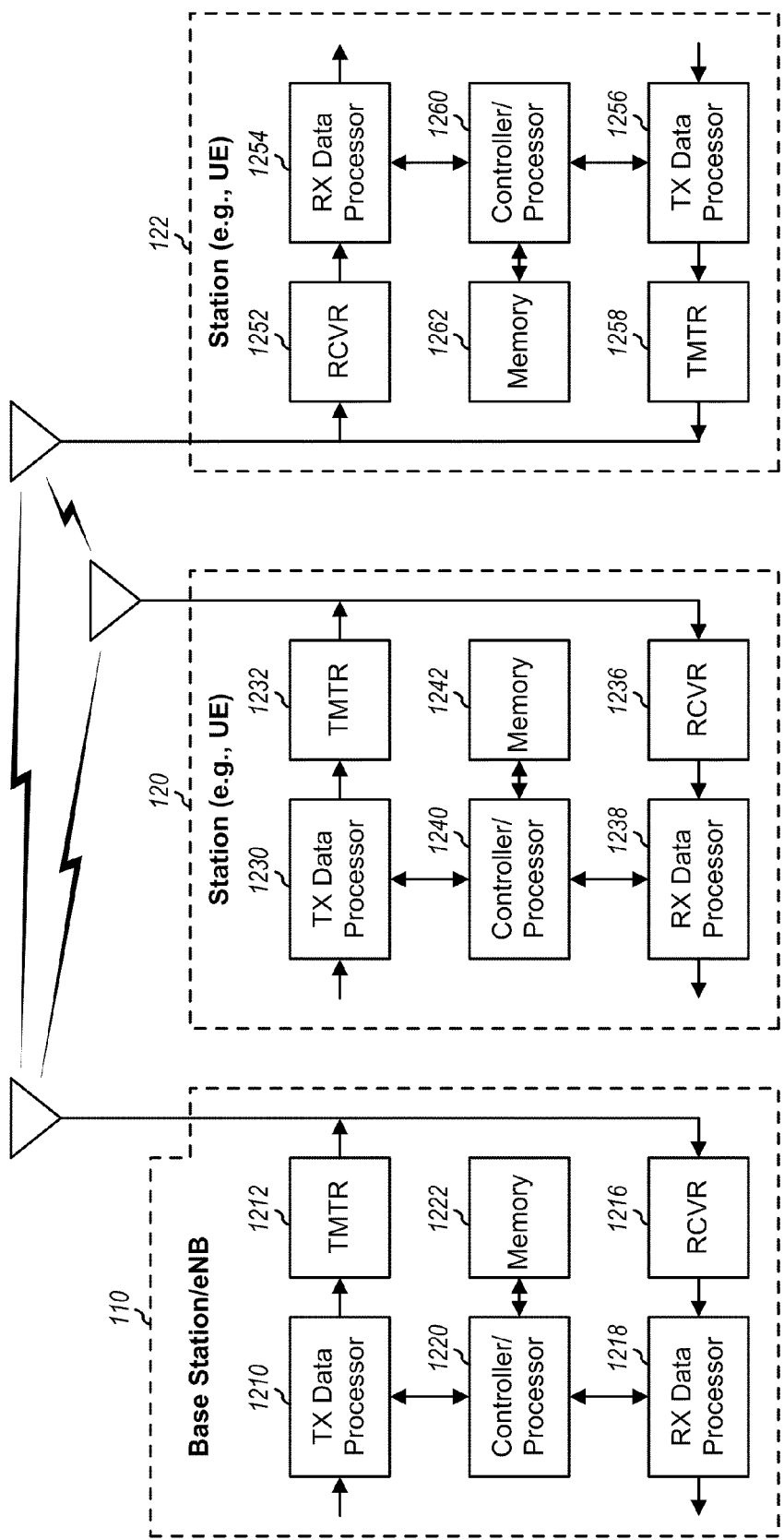
FIG. 12 shows a design of a base station and two stations.

FIG. 12 shows a block diagram of a design of base station/eNB 110 and two stations 120 and 122. Each station may be a UE or some other entity. At base station 110, a transmit (TX) data processor 1210 may receive data to send to stations and may process (e.g., encode and modulate) the data for each station in accordance with one or more modulation and coding schemes for that station to obtain data symbols. Processor 1210 may also process control information to obtain control symbols, generate reference symbols for reference signal, and multiplex the data symbols, the control symbols, and the reference symbols. Processor 1210 may further process the multiplexed symbols (e.g., for OFDM, etc.) to generate output samples. A transmitter (TMTR) 1212 may condition (e.g., convert to analog, amplify, filter, and upconvert) the output samples to generate a downlink signal, which may be transmitted to stations 120 and 122.

At station 120, the downlink signal from base station 110 may be received and provided to a receiver (RCVR) 1236. Receiver 1236 may condition (e.g., filter, amplify, downconvert, and digitize) the received signal and provide input samples. A receive (RX) data processor 1238 may process the input samples (e.g., for OFDM, etc.) to obtain received symbols. Processor 1238 may further process (e.g., demodulate and decode) the received symbols to recover data and control information sent to station 120. On the uplink, a TX data processor 1230 may process (e.g., encode and modulate) data and control information to be sent by station 120 to obtain data symbols and control symbols. Processor 1230 may also generate reference symbols, multiplex the data and control symbols with the reference symbols, and process the multiplexed symbol (e.g., for SC-FDMA, etc.) to obtain output samples. A transmitter 1232 may condition the output samples and generate an uplink signal, which may be transmitted to base station 110 and/or station 122.

At base station 110, the uplink signal from station 120 may be received and conditioned by a receiver 1216, and processed by an RX data processor 1218 to recover the data and control information sent by station 120. A controller/processor 1220 may control data transmission on the downlink and uplink.

Station 120 may also communicate peer-to-peer with station 122. Data, control information, and reference signals may be processed by TX data processor 1230, conditioned by transmitter 1232, and transmitted to station 122. A P2P signal from station 122 may be received and conditioned by receiver 1236 and processed by RX data processor 1230 to recover data, control information, and reference signals sent by station 122.

Station 122 includes a receiver 1252, a transmitter 1258, an RX data processor 1254, a TX data processor 1256, a controller/processor 1260, and a memory 1262 that may operate in similar manner as the corresponding units at station 120.

Controllers/processors 1220, 1240 and 1260 may control the operation at base station 110, station 120, and station 122, respectively. Controller/processor 1220 may also perform or direct process 200 in FIG. 2, process 400 in FIG. 4, process 800 in FIG. 8, process 1000 in FIG. 10, and/or other processes for the techniques described herein. Controllers/processors 1240 and 1260 may each perform or direct process 800 in FIG. 8 and/or other processes for the techniques described herein. Memories 1222, 1242 and 1262 may store data and program codes for base station 110, station 120, and station 122, respectively.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus for wireless communication, comprising:
   a memory; and
   at least one processor coupled to the memory and configured to:
      send an indication of a first station desiring to communicate with a second station, the indication being sent from the first station to a network entity;
      send information indicative of a quality of a communication link between the first station and the second station, the information being sent from the first station to the network entity and including one or more pilot measurements;
      receive, from the network entity, information indicative of a decision for whether or not to use peer-to-peer communication between the first and second stations, the information including an assignment of one or more wireless wide area network (WWAN) resources for the first station by the network entity, the decision based on an estimated amount of interference that would be caused by the first station and the second station if in peer-to-peer communication and an estimated amount of interference caused by the first station and the second station if in WWAN communication; and
      communicate with the second station in response to a reception of information indicative of a selection of peer-to-peer communication from the network entity and based on the assignment of one or more WWAN resources.

2. The apparatus of claim 1, wherein to communicate with the second station in response to the reception of information indicative of a selection of peer-to-peer communication from the network entity and based on the assignment of one or more WWAN resources, the at least one processor is further configured to communicate directly with the second station.

3. The apparatus of claim 1, wherein the at least one processor is further configured to communicate with the second station via the network entity in response to a reception of information indicative of foregoing selection of peer-to-peer communication from the network entity.

4. The apparatus of claim 1, wherein to send information indicative of the quality of the communication link between the first station and the second station, the at least one processor is further configured to send information indicative of interference at the first station.

5. A non-transitory computer-readable medium storing computer executable code, comprising:
   code for causing at least one computer to send an indication of a first station desiring to communicate with a second station, the indication being sent from the first station to a network entity;
   code for causing at least one computer to send information indicative of a quality of a communication link between the first station and the second station, the information being sent from the first station to the network entity and including one or more pilot measurements;
   code for causing the at least one computer to receive, from the network entity, information indicative of a decision for whether or not to use peer-to-peer communication between the first and second stations, the information including an assignment of one or more wireless wide area network (WWAN) resources for the first station by the network entity, the decision based on a comparison of an estimated amount of interference that would be caused by the first station and the second station if in peer-to-peer communication and an estimated amount of interference caused by the first station and the second station if in WWAN communication; and
   code for causing the at least one computer to communicate with the second station in response to receiving information indicative of a selection of peer-to-peer communication from the network entity and based on the assignment of one or more WWAN resources.

6. A method of wireless communication, comprising:
sending an indication of a first station desiring to communicate with a second station, the indication being sent from the first station to a network entity;
sending information indicative of a quality of a communication link between the first station and the second station, the information being sent from the first station to the network entity and including one or more pilot measurements;
receiving, from the network entity, information indicative of a decision for whether or not to use peer-to-peer communication between the first and second stations, the information including an assignment of one or more wireless wide area network (WWAN) resources for the first station by the network entity, the decision based on an estimated amount of interference that would be caused by the first station and the second station if in peer-to-peer communication and an estimated amount of interference caused by the first station and the second station if in WWAN communication; and
communicating with the second station in response to a reception of information indicative of a selection of peer-to-peer communication from the network entity and based on the assignment of one or more WWAN resources.

7. The method of claim 6, wherein communicating with the second station in response to the reception of information indicative of a selection of peer-to-peer communication from the network entity and based on the assignment of one or more WWAN resources includes communicating directly with the second station.

8. The method of claim 6, further comprising communicating with the second station via the network entity in response to a reception of information indicative of foregoing selection of peer-to-peer communication from the network entity.

9. The method of claim 6, wherein sending information indicative of the quality of the communication link between the first station and the second station includes sending information indicative of interference at the first station.

10. The method of claim 6, wherein the one or more WWAN resources include at least a transmit power level for the first station.

11. The method of claim 6, wherein the assignment of the one or more WWAN resources for the first station includes an assignment of one or more first resources for transmission according to time division duplexing (TDD) on an uplink communication channel or one or more second resources for communication according to frequency division duplexing (FDD) on one or both of a downlink or uplink communication channel.

* * * * *